United States Patent
Wittenschlaeger

(10) Patent No.: US 10,349,461 B2
(45) Date of Patent: *Jul. 9, 2019

(54) BACKHAUL FABRIC FOR WIRELESS NETWORK

(71) Applicant: Nant Holdings IP, LLC, Culver City, CA (US)

(72) Inventor: Thomas Wittenschlaeger, Flowery Branch, GA (US)

(73) Assignee: Nant Holdings IP, LLC, Culver City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/856,593

(22) Filed: Dec. 28, 2017

(65) Prior Publication Data

US 2018/0160350 A1 Jun. 7, 2018

Related U.S. Application Data

(60) Continuation of application No. 15/784,527, filed on Oct. 16, 2017, which is a continuation of application
(Continued)

(51) Int. Cl.
*H04B 7/19* (2006.01)
*H04B 7/185* (2006.01)
(Continued)

(52) U.S. Cl.
CPC .......... *H04W 76/20* (2018.02); *H04B 7/1856* (2013.01); *H04B 7/18504* (2013.01); *H04B 7/18584* (2013.01); *H04B 7/19* (2013.01);

*H04L 41/12* (2013.01); *H04W 36/12* (2013.01); *H04W 36/18* (2013.01); *H04W 36/24* (2013.01);
(Continued)

(58) Field of Classification Search
CPC ...... H04L 41/12; H04L 47/829; H04W 76/20; H04W 36/12; H04W 36/18
See application file for complete search history.

(56) References Cited

U.S. PATENT DOCUMENTS

| | | |
|---|---|---|
| 5,924,014 A | 7/1999 | Vanden Heuvel et al. |
| 6,078,810 A | 6/2000 | Olds et al. |

(Continued)

OTHER PUBLICATIONS

Malakooti, "Roadmap for Developing Reconfigurable Intelligent Internet Protocols for Space Communication Networks"; Report for Case Western ReserveUniversity, Jun. 29, 2004; pp. 1-23; version 7; Cleveland, Ohio.

*Primary Examiner* — Kevin C. Harper
(74) *Attorney, Agent, or Firm* — Mintz Levin Cohn Ferris Glovsky and Popeo, P.C.

(57) ABSTRACT

A surface-based network fabric comprises a plurality of surface nodes interconnected with each other through physical links, and an intermediary network fabric comprises a plurality of intermediary notes configured to communicate with the surface nodes, wherein the intermediary nodes include aircraft. A network fabric manager establishes a network topology among the surface nodes and the intermediary nodes to communicatively connect a first wireless device to a second wireless device, and migrates from a first surface node to a second surface node while retaining connectivity between the first wireless device and the second wireless device.

20 Claims, 3 Drawing Sheets

Related U.S. Application Data

No. 15/464,908, filed on Mar. 21, 2017, now Pat. No. 9,813,959, which is a continuation of application No. 13/948,344, filed on Jul. 23, 2013, now Pat. No. 9,642,179, which is a division of application No. 13/453,857, filed on Apr. 23, 2012, now Pat. No. 8,493,889, which is a division of application No. 12/552,186, filed on Sep. 1, 2009, now Pat. No. 8,189,496, which is a continuation of application No. 12/250,342, filed on Oct. 13, 2008, now Pat. No. 7,599,314, which is a continuation-in-part of application No. 12/120,024, filed on May 13, 2008, now Pat. No. 7,548,545.

(60) Provisional application No. 61/079,892, filed on Jul. 11, 2008, provisional application No. 61/014,306, filed on Dec. 17, 2007, provisional application No. 61/014,367, filed on Dec. 17, 2007, provisional application No. 61/013,852, filed on Dec. 14, 2007, provisional application No. 61/023,004, filed on Jan. 23, 2008.

(51) Int. Cl.
*H04L 12/24* (2006.01)
*H04W 36/12* (2009.01)
*H04W 36/18* (2009.01)
*H04W 36/24* (2009.01)
*H04W 76/20* (2018.01)
*H04W 76/25* (2018.01)
*H04W 84/06* (2009.01)

(52) U.S. Cl.
CPC ........ *H04L 41/042* (2013.01); *H04W 76/25* (2018.02); *H04W 84/06* (2013.01)

(56) References Cited

U.S. PATENT DOCUMENTS

| | | | |
|---|---|---|---|
| 6,195,037 | B1 | 2/2001 | Gross et al. |
| 6,973,027 | B1 | 12/2005 | Shaffer et al. |
| 6,985,454 | B1 | 1/2006 | Wiedeman et al. |
| 7,352,745 | B2 | 4/2008 | Perera et al. |
| 7,366,125 | B1 | 4/2008 | Elliott |
| 7,398,088 | B2 | 7/2008 | Belkin et al. |
| 7,548,545 | B1 | 6/2009 | Wittenschlaeger |
| 7,599,314 | B2 * | 10/2009 | Wittenschlaeger ...... H04B 7/19 370/254 |
| 8,493,889 | B2 * | 7/2013 | Wittenschlaeger ...... H04B 7/19 370/254 |
| 9,642,179 | B2 | 5/2017 | Wittenschlaeger |
| 2002/0072361 | A1 | 6/2002 | Knoblach et al. |
| 2003/0109220 | A1 | 6/2003 | Hadinger et al. |
| 2003/0202465 | A1 | 10/2003 | Cain |
| 2004/0116141 | A1 | 7/2004 | Loven et al. |
| 2005/0259571 | A1 | 11/2005 | Battou |
| 2006/0077909 | A1 | 4/2006 | Saleh et al. |
| 2006/0179147 | A1 | 8/2006 | Tran et al. |
| 2006/0193473 | A1 | 8/2006 | Fu |
| 2006/0193474 | A1 | 8/2006 | Fransdonk et al. |
| 2006/0280131 | A1 | 12/2006 | Rahman et al. |
| 2007/0021052 | A1 | 1/2007 | Boice |
| 2007/0115967 | A1 | 5/2007 | Vandenberghe et al. |
| 2007/0121503 | A1 | 5/2007 | Guo et al. |
| 2008/0043663 | A1 | 2/2008 | Youssefzadeh et al. |
| 2008/0155070 | A1 | 6/2008 | El-Damhougy et al. |
| 2008/0297406 | A1 | 12/2008 | Dragne et al. |
| 2012/0002640 | A1 | 1/2012 | Baluja et al. |

\* cited by examiner

BACKHAUL FABRIC FOR WIRELESS NETWORK

This application is a continuation of U.S. Ser. No. 15/784,527, filed Oct. 16, 2017, which is a continuation of U.S. Ser. No. 15/464,908, filed Mar. 21, 2017 and issued as U.S. Pat. No. 9,813,959 on Nov. 7, 2017, which is a continuation of U.S. Ser. No. 13/948,344, filed Jul. 23, 2013 and issued as U.S. Pat. No. 9,642,179 on May 2, 2017, which is a divisional of U.S. Ser. No. 13/453,857, filed Apr. 23, 2012 and issued as U.S. Pat. No. 8,493,889 on Jul. 23, 2013, which is a divisional of U.S. Ser. No. 12/552,186 filed Sep. 1, 2009 and issued as U.S. Pat. No. 8,189,496 on May 29, 2012, which is a continuation of U.S. Ser. No. 12/250,342 filed Oct. 13, 2008 and issued as U.S. Pat. No. 7,599,314 on Oct. 6, 2009, which claims priority to U.S. Ser. No. 61/079,892 filed Jul. 11, 2008 and was a continuation-in-part of U.S. Ser. No. 12/120,024 filed on May 13, 2008 and issued as U.S. Pat. No. 7,548,545 on Jun. 16, 2009, which claims priority to U.S. Ser. No. 61/024,842 filed on Jan. 30, 2008, U.S. Ser. No. 61/023,004 filed on Jan. 23, 2008, U.S. Ser. No. 61/014,306 filed Dec. 17, 2007, U.S. Ser. No. 61/014,367 filed Dec. 17, 2007, and U.S. Ser. No. 61/013,852 filed Dec. 14, 2007. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is networking technology involving spacecraft.

BACKGROUND

Global data communication infrastructure has developed dramatically over the last several decades. Individuals can currently access data over the Internet from nearly anywhere in the world. Additionally, satellites allow for point-to-point communications over the horizon of the Earth to support global positioning systems (GPS), television broadcasts, military communications, or other surface-to-surface communications. Unfortunately, satellites generally only provide a "bent-pipe" communication between two ground stations as opposed to integrating into a networked communication system such as the Internet. Bent-pipe communications suffer from a number of problems, not the least of which is susceptibility to local jamming at a ground station. If one ground station is unable to send or receive a signal due to jamming, the communication is lost. Loss of an up/down communication link with a satellite during a military operation, a first response to a disaster, or urgent scenario can cause severe loss of life or can cause substantial financial losses.

Preferably satellites or other spacecraft should form a network in space and integrate with a surface network at multiple points in a seamless fashion to overcome loss of a single up/down communication link. Communications can be reestablished through one or more alternative paths through the space-based network, the surface-based network, or any combination. Ideally, the space and the surface-based networks should integrate to form a single surface-space network fabric.

The need for such a surface-space network fabric has been articulated multiple times. NASA publication NASA/TM-2004-213109 (AIAA-2004-3253) titled "Developing Architectures and Technologies for an Evolvable NASA Space Communication Infrastructure" by Bhasin et al. describes various features for an interplanetary communication network. Additionally, the Joint Capability Technology Demonstration (JCTD) program sponsored by the U.S. Department of Defense (http://www.acq.osd.mil/jctd/) also expressed a need for network communications in space. In 2007, the DoD requested proposals for a JCTD directed toward Internet Protocol Routing in Space (IRIS). The stated goals of the IRIS JCTD are:

"In coordination with commercial satellite communications providers, implements Internet Protocol (IP) routing and dynamic bandwidth resource allocation capabilities from a geostationary commercial communication satellite, which enables cross-band, cross-beam routing. Shows scalability, "any-to-any" connectivity within the coverage of the satellite, and satellite bandwidth IP gain. Advances DoD's guidance to grow an IP foundation across the enterprise and also builds the business model and contracting processes for DoD to use emerging commercial capabilities."

The three year program was awarded to Intelsat General Corp of Bethesda, Md. Intelsat plans on working with Cisco Systems, Inc. of San Jose, Calif., and SEAKR Engineering Inc. of Denver, Colo., to create radiation hardened routers for deployment within a satellite. Unfortunately, little or no results have yet been announced nor does the contemplated IP network integrate with surface-based fabrics.

Others have also attempted to provide a space-based network. For example, U.S. Pat. No. 7,366,125 to Elliot titled "Extensible Satellite Communicate System" describes a satellite network where backbone satellites act as routers for data transmitted through a network. Although useful for allowing satellites to communicate among each other, the contemplated backbone network also fails to integrate into a surface network. In a similar vein, U.S. Pat. No. 6,078,810 to Olds et al. titled "Multiple-Tier Satellite Communication System and Method of Operation Thereof" also provides for having satellites transmit data (e.g., media content) among each other. Although useful for distributing media content, Olds also fails to provide for integrating space fabrics into surface fabrics.

U.S. Patent Publication 2008/0043663 to Youssefzadeh et al. titled "Satellite Communication with Multiple Active Gateways" contemplates that a master ground station can operate as a gateway to a network including the Internet. Slave ground stations communicate with the master ground station using TDMA channels relayed through satellites in geosynchronous orbits. Although Youssefzadeh provides for another master ground station to take over for a failed master, Youssefzadeh fails to provide for forming a surface-space network fabric.

U.S. Patent Publication 2008/0155070 to El-Damhougy et al. titled "Method of Optimizing an Interplanetary Communications Network" describes a solution for an ad-hoc network having spaced based and ground-based nodes where the nodes are located at extreme distances from Earth. Each node comprises an artificial neural network that allows the node to self-manage and self-maintain the connectivity of the node. Such an ad-hoc network can be useful in circumstances where nodes are out of reach of their human controllers. However, an ad-hoc network lacks sufficient determinism for mission critical applications. A stronger centralized management system would be required for mission critical surface-space fabrics.

U.S. Patent Publication 2005/0259571 to Battou titled "Self-Healing Hierarchical Network Management System, and Methods and Apparatus Therefore" describes managing multiple networks by organizing the managers of the networks into a hierarchical structure. A root manager oversees the mangers below it in the structure. Should a manager fail, then another manger can take its place. Although useful in a surface-based network, the Battou structure is unsuitable for a surface-space fabric where the space fabric can become decoupled from a surface fabric.

In addition to effort directed toward establishing networks in space, effort has been put forth toward robust protocols for use in space. For example, the article titled "Roadmap for Developing Reconfigurable Intelligent Internet Protocols for Space Communication Networks" dated Jun. 29, 2004, by Malakooti of Case Western Reserve University's Electrical Engineering and Computer Science Department describes a development roadmap for an Intelligent Internet Protocol (IIP). Although useful in exchanging data under highly variable conditions in space, IIP also lacks support for sufficient determinism in a space-surface fabric.

Interestingly, a great deal of efforts has been directed to creating a network in space and protocols. Less effort has been directed toward seamlessly integrating such a network with surface-based infrastructure. Little or no effort has been directed toward managing a communication topology of an integrated surface-space network in a substantially deterministic fashion. What has yet to be appreciated is that a surface-space network fabric can be managed via one or fabric managers where any node in the fabric, either a spaced-based node or a surface-based node, can operate as the fabric manager.

Thus, there is still a need for surface-space managed network fabric.

SUMMARY OF THE INVENTION

The present invention provides apparatus, systems and methods in which a surface to space network fabric can be created from multiple network fabrics working in cooperation with each other. A space-based network fabric comprising a plurality of spacecraft networking nodes provide a communication infrastructure whose communication topology is configured or controlled through a spaced based fabric manager. The space fabric can be communicatively coupled to a surface-based network fabric having a surface-based fabric manager. A global fabric manager establishes a global communication topology among the spacecraft and the surface-based nodes in cooperation with the various fabric managers. In a preferred embodiment, the nodes of the space and the surface fabric are fungible with respect to taking on the roles or responsibilities of their respective fabric managers. Additionally, all nodes of the surface-space fabric can be fungible with respect to the roles or responsibilities of being the global fabric manager.

Spacecraft nodes are located in space (e.g., at altitudes greater than 100 Km) moving relative to a surface of the Earth or substantially stable with respect to positions on the surface. Preferred spacecraft nodes include satellites in geosynchronous orbit. It is also contemplated that spacecraft can be placed in lower or higher orbits as desirable. Furthermore, spacecraft can also be placed at LaGrange points.

In some embodiments, a surface-space network fabric can include one or more intermediary network fabrics comprising intermediary network nodes. Contemplated intermediary network nodes can include low-earth orbit (LEO), powered flight aircraft, or non-powered flight aircraft.

Various objects, features, aspects and advantages of the inventive subject matter will become more apparent from the following detailed description of preferred embodiments, along with the accompanying drawings in which like numerals represent like components.

DETAILED DESCRIPTION

Although the following description provides examples of network fabrics having a small number of network nodes, communication links, data channels, or data paths, it should be noted that a fabric can comprise any number of nodes, data links, or data channels.

Network Fabric Overview

The general concepts of a network fabric as presented herein can be equally applied to a network fabrics located in space or on the surface of the Earth, or other massive body. The term "Earth" is used in this document to mean a massive body and should be interpreted to mean a massive body around which another physical object can orbit. Other massive bodies can include moons, planets, stars (e.g., the Sun), asteroids, comets, or other bodies found in or around a solar system.

Figure 1:
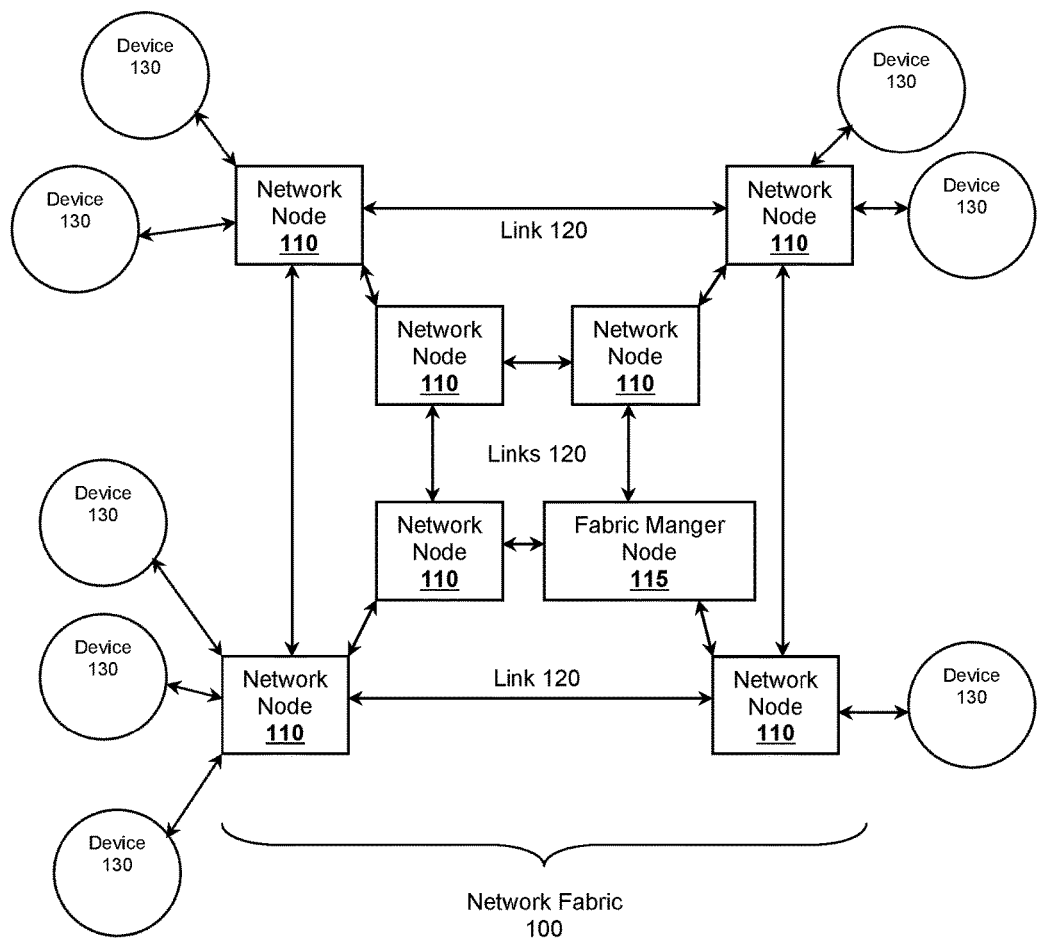
FIG. 1 is a schematic of a distributed core fabric.

In FIG. 1 network fabric 100 comprises a plurality of networked nodes 110 interconnected through a plurality of physical communication links 120 connecting neighboring network nodes. In a preferred embodiment, each link 120 can support one or more data channels to connect any network node 110 to another node 110. Additionally, data paths can be established from one of device 130 to another device 130 utilizing one or more data channels and one or more data links 120. Network fabrics can include fabrics for internetworking, storage area networks, distributed computing buses, mesh networks, peer-to-peer networks, or other type of network.

Devices 130 can include any system connected to network fabric 100 via nodes 110, and represent end-points for communications. Example devices include computers, set-top boxes, game consoles, storage devices, handheld devices (e.g., mobile phones, PDAs, etc. . . . ), sensors, spacecraft, space stations, satellites, or other devices that would benefit from network access. Devices 130 communicate with each other preferably sending packets across fabric 100. It should be noted that devices 130 are considered to be differentiated from nodes 110 in that devices 130 ordinarily lack switching or routing capabilities.

In a preferred embodiment, network nodes 110 comprise devices that incorporate network switches, that when connected together provides dynamic packet routing across fabric 100, preferably at or below layer two of the OSI model. Network nodes 110 function as networking infrastructure devices having routing information on how to switch packets among paths available though the nodes. Network nodes 110 should not be confused with a mere relay station (e.g., a satellite offering a "bent pipe" communication). A relay station lacks routing knowledge on how to switch packets among paths through the network. Although the preferred embodiment provides a fabric at layer two of the OSI model, it is also contemplated that the inventive subject matter can be advantageously applied to other layers including layer three of the OSI model (e.g., IPv4 or IPv6) or above. A fabric operating at layer two or lower offers several advantages. For example, each node can provide for cut-through routing from an ingress port to an egress port within the node with little or no overhead due to protocol processing overhead.

Links 120 can be wired or wireless as required by deployment of nodes 110. For example, nodes 110 deployed on the surface of the Earth can be wired (e.g., Ethernet cables, optic fibers, USB, Firewire, Infiniband, etc. . . . ), or wireless (e.g., 802.11, UWB, WiMAX, etc. . . . ). Nodes 110 deployed at high altitude or in space preferably employ wireless links including radio frequency (RF) links, optical links (e.g., lasers), or microwave links (e.g., C band, Ku band, Ka band, etc. . . . ). Preferred links support bandwidths of at least 10 Gbps and latencies less than 10 microseconds. Additionally, preferred links support multiple data channels on a single physical channel. Optic fibers, for example, represent a suitable link for surface nodes because fibers can support high-bandwidth, low-latency data transport on multiple channels where each channel corresponds to a different wavelength of light.

Network node 110 should not be considered limited to network switches, Ethernet or otherwise. Rather network nodes 110 can also include other forms of networking infrastructure including routers, bridges, gateways, access points, repeaters, or other networking devices offering interconnectivity.

Preferably, each of links 120 is a port-to-port communications link, wired or wireless, between two connected neighboring nodes 110. In a preferred fabric, each physical link 120 between two nodes 110 can also support multiple data channels. For example, a single optic fiber representing a link between two neighboring network nodes 110 can support multiple data channels where each data channel on the optic fiber uses a different wavelength of light to transport data. Additionally, a laser or an RF communication link between to satellites can support multiple channels.

Multiple links 120 and data channels can be combined to form one or more data paths from one physical port on a node 110 to another port located anywhere on fabric 100. In this sense, a data path should be considered a port-to-port route. A data path can provide data transport using low-level protocols, Ethernet or ATM, for example. Additionally, a data path can support data transport data using high-level protocols (e.g., IPv4, IPv6, TCP, UDP, etc. . . . ) as desired by devices 130.

Data paths are preferably constructed by a fabric manager 115 whose responsibilities include storing route tables, disseminating routes, or assigning paths. Co-owned U.S. Pat. No. 7,352,745 titled "Switching system with distributed switching fabric" issued Apr. 1, 2008, describes suitable methods for establishing data paths through a switched fabric.

In a preferred embodiment, fabric 100 comprises a distributed core fabric. Raptor Networks Technology, Inc. of Santa Ana Calif. (http://www.raptor-networks.com/) provides suitable network switches, including the ER-1010 switch, which can be used to create a distributed core fabric. Multiple ER-1010 switches can be deployed to form a distributed core fabric by connecting the switches through optic fibers to create a packet-switched network. Additionally, the Raptor technology can be adapted for deployment within spacecraft to support a switching fabric in space utilizing optical links (e.g, lasers) or RF-based links. As used herein, "distributed core" means a plurality of network nodes operating as a single coherent device. For example, interconnected Raptor switches can function as a single large switch.

A distributed core fabric preferably lacks a need for spanning tree protocol because the network fabric comprises nodes that self-organize to behave as one coherent device. Once the nodes are organized according to a communication topology based on routing tables, data is then routed dynamically through fabric via one or more constructed data paths.

Nodes 110 preferably comprises one or more physical ports through which data packets can be exchanged with devices 130 or other nodes 110. A physical port can is considered to comprise one or more physical components capable of receiving or transmitting signals to a neighboring node 110. Examples include receptacles for wired connections (e.g., RJ-45 jacks, Firewire connectors, USB connectors, etc. . . . ), optical sensors for sending or receiving laser transmissions, or antennas for reception or transmission of RF or microwave signals. Preferred ports are bi-directional and can both transmit and receive signals.

Preferably, fabric 100 comprises fabric manager 115. In a preferred embodiment, nodes 110 are fungible with respect to being a fabric manager. Fabric manager 115 preferably comprises one or more software modules adapted to take on management roles or responsibilities with respect to two or more nodes 110 of fabric 100. Management responsibilities can include configuring communication topologies, monitoring fabric metrics, inventorying nodes of the fabric, logging events within the fabric, alerting external entities to conditions of the fabric, reporting activities of the fabric, recovering from fabric faults, or enforcing security.

In a distributed core fabric where each node 110 is fungible with respect to management functions, fabric manager 115 can migrate from one node 110 to another node 110. Manager migration provides for additional security within fabric 100 by reducing the risk that an external would know where a manager is located. Manager 115 can migrate in deterministic fashion or non-deterministic fashion. In a preferred embodiment surface fabric managers, space fabric mangers, global managers, or other fabric managers can migrate. Additional discussion with respect to manager migration can be found in parent, co-owned U.S. Patent Application having Ser. No. 12/120,024 filed on and titled "Disaggregated Network Management".

In a preferred embodiment, fabric manager 115 is configured to establish a communication topology among nodes 110 of fabric 100. Within this document, a "communication topology" is considered to comprise a plurality of port-to-port data paths among nodes 110. One should note that a communication topology is not merely an arrangement of nodes with connections. Rather, a communication topology also includes the mapping of data paths from a first port to a second port, and could include multiple paths. Fabric manager 115 assigns paths and establishes a routing table comprising the communication topology information. Manager 115 preferably disseminates the information to nodes 110 of fabric 100. Each of node 110 can locally store the topology information and use the information to determine internally how to switch a packet arriving at an ingress port to an egress port in order to forward the packet on toward its final destination port. As previously mentioned, a suitable method for assigning paths of a communication topology is discussed in co-owned U.S. Pat. No. 7,352,745 titled "Switching system with distributed switching fabric" issued Apr. 1, 2008.

A preferred routing table includes a list of the most desirable paths from a port to other ports. In some embodiments, the table includes all possible paths from all ports to all other ports. Each path can be identified by a route ID used as an index into a routing table. As packets enter fabric 100 from an ingress port, the receiving node 110 determines the destination of the packets (e.g., by destination IP address, destination MAC address, or other destination ID). The receiving node 110 can then select a path from the routing table that connects the ingress port to the egress port on fabric 100 that connects to the destination. The path's route ID can be appended to the packets, and the packets forwarded to the next node 110 on the path. Each subsequent node 110 uses the route ID as in index into its local copy of the route table to look-up the next hop. The packets are preferably forwarded until they reach their destination port where the routed ID is stripped from the packets and the packets are presented to the destination. Should a fault occur along a path where a node is lost, a sending node can change the path for a packet by changing the route ID of the packet. The new path referenced by the new route ID preferably preserves the source and destination while avoiding failed nodes, links, or channels.

Several advantages become clear with respect to switching packets based on routing tables storing desirable paths. One advantage includes that packets can be routed in a cut-through fashion with little or no introduction of latency. For example a packet can be forwarded quickly (e.g., much less than 10 microseconds) by conducting a quick table look-up. An additional advantage includes that the packet transport across fabric 100 is protocol agnostic. A low-level distributed core fabric provides for a high-capacity (e.g., greater than 10 Gbps), low latency (e.g., less than 10 microsecond) communication transport that can support any upper layer protocol including Ethernet, IPv4, IPv6, TCP, UDP, or any other protocols.

Surface-Space Network Fabric

Figure 2:
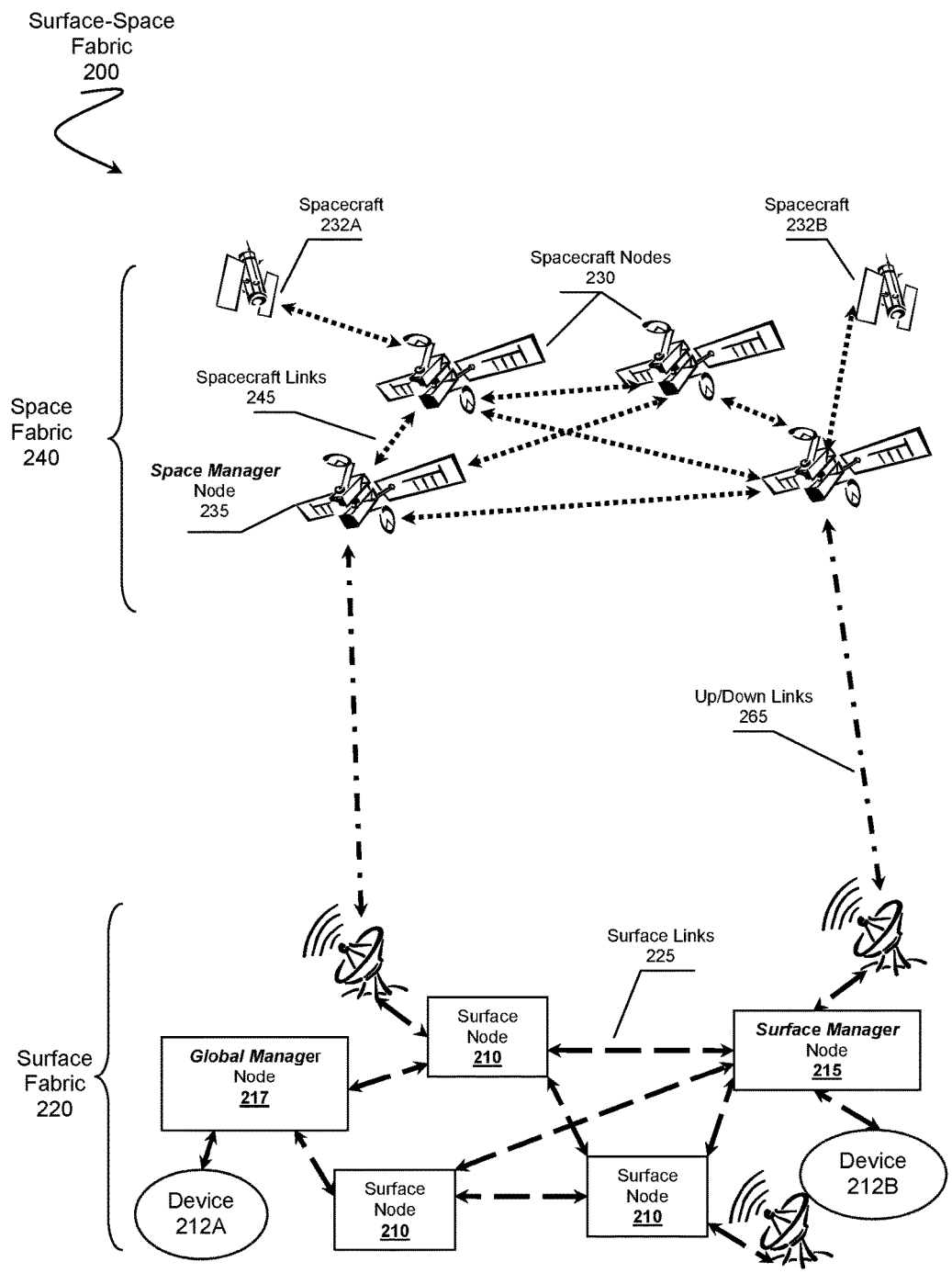
FIG. 2 is a schematic of a surface-space network fabric having a space fabric and surface fabric managed by a global fabric manager.

In FIG. 2, surface-space network fabric 200 comprises space fabric 240 and surface fabric 220. Space fabric 240 is preferably communicatively coupled to surface fabric 220 by a plurality of up/down links 265. Each fabric can comprise a fabric manager, space manager 235 or surface manager 215, which has responsibility for management of its local fabric. Additionally, in a preferred embodiment, fabric 200 also comprises global manager 217 that has management responsibility of entire surface-space fabric 200.

Space-Based Network Fabric

Space fabric 240 comprises a plurality of spacecraft nodes 230 comprising any suitable spacecraft adapted to operate as a networking node to form a distributed core fabric. Contemplated spacecraft include satellites in orbit, probes, space stations, or other spacecraft, manned or unmanned. Fabric 240 provides a packet switched network capable of transporting data packet among two or more spacecraft 232A through 232B.

Spacecraft nodes 230 communicate with each other or with one or more of spacecraft 232A through 232B via spacecraft links 245. Links 245 can include optical communication links (e.g., lasers), radio communications, or microwave communications. Preferred links 265 can support inter-spacecraft communications two or more data channels using the same physical link. Techniques known in the art for providing multiple channels on a link include frequency-division multiple access (FDMA), time-division multiple access (TDMA), code-division multiple access (CDMA) or spread spectrum multiple access (SSMA), to name a few.

In a preferred embodiment, a spacecraft is adapted with a fabric switching module comprising software, hardware, or a combination of both that enable spacecraft nodes 230 to function as networking infrastructure by switching packets entering node 230 on an ingress port to an appropriate egress ports as previously discussed. In some embodiments, a switching fabric is based on Raptor switching technology adapted for use in space. For example, an ER-1010 Raptor switch can be adapted to be robust against the extremes of space including radiation, heat, cold, vacuum, high-G launch, or against other extremes. It is also preferred that a switching module incorporated into spacecraft node 230 operate as a fabric manager for space fabric 240, for example space manager 235 is both a networking node as well as the manager of fabric 240. In this respect, each of spacecraft nodes 230 is fungible with respect to being the fabric manager. One should also appreciate that nodes 230 can also operate as a global fabric manager for surface-space fabric 200. Once a spacecraft has been incorporated with a fabric switching module, the spacecraft can be launched as desired. In some embodiments, spacecraft nodes 230 include redundant switching modules to protect against potentially fatal failure of a primary module.

A switching module can also include a software update to existing, suitably equipped spacecraft already deployed in space. The software update can be loaded into memory on board spacecraft node 230 using an up/down link 265. Once installed, the software update can provide packet switching capability among data channels for links 245 or links 265. Additionally, the software update can include fabric management functions for configuring a communication topology among nodes 230.

Space fabric manager 235 configures a topology among nodes 230 utilizing port-level information aggregated from nodes 230. Manager 235 uses the port-level information to construct a routing table having assigned paths from a first port to a second port, preferably multiple paths, anywhere in the fabric. Fabric manager 235 disseminates the routing table to all other nodes 230. Each node 230 can determine how to forward packets at the port-level by consulting the routing table. In this manner, space fabric manager 235 configures a communication topology among nodes 230. It should be noted that the communication topology also comprises multiple port-to-port paths for redundancy. Should a node 230 loose connectivity, a forwarding node 230 can consult its routing table to determine an alternative path for a packet.

Spacecraft nodes 230 can form space fabric 240 located anywhere in space (e.g., above 100 Km) as long as nodes 230 can retain some level of interconnectivity. For example, spacecraft nodes 230 can be placed in low-Earth orbit (LEO; up to 2000 Km), medium Earth orbit (MEO; 2000 Km to about 35,700 Km), geosynchronous orbit (GEO; at about 35,700 Km), high Earth orbit (HEO; more than 35,700 Km), or other orbits. It is also contemplated that spacecraft nodes 230 can be placed in orbits that are relatively stable with respect to Earth's position including LaGrange points (e.g., L1, L2, L3, L4, or L5) where the forces of gravity of massive bodies (e.g., Earth, Moon, or Sun) are countered by centripetal force due to the spacecraft's obits. Although the previous orbits are discussed with reference to the Earth, one skilled in the art will recognize the orbital altitudes or locations would be different with respect to another massive body, Mars for example.

In a preferred embodiment of fabric 240, nodes 230 comprise a constellation of GEO satellites. GEO satellites have reduced relative movement with respect to each other and with respect to ground stations allowing for stable, high bandwidth inter-satellite communications. For example, geosynchronous satellites can intercommunicate via lasers at 10 Gbps. A suitable method for inter-satellite communication using lasers is described in the article titled "Next-Generation Satellite Laser Communications System", authored by Hiroo Kunimori, published in the December, 2004, issued of NiCT News (No. 345). A geosynchronous fabric provides for a globally spanning communication network accessible from nearly anywhere from the planet.

Fabric 240 communicates with one or more surface fabrics 220 located on the surface of the Earth via a plurality of up/down links 265. Up/down links 265 can utilize existing technology to allow nodes 230 to communication with nodes 210 of fabric 220. For example, up/down links 265 can include RF or microwave communication links, capable of supporting more than one data channel. Typical links in use today can employ the $K_a$ band supporting a few Gbps. Other links in use today use the C band or $K_u$ band of the electromagnetic spectrum. In a preferred embodiment, up/down links 265 comprise an aggregated link combining more than one channel to form a high capacity link supporting at least 10 Gbps. An up/down link 265 having a bandwidth of 10 Gbps allows the link to properly bind with commercially available network switching silicon that can be deployed within switches for surface nodes 210.

Up/down links 265 can connect directly to surface nodes 210 or indirectly through ground stations. Regardless of the means of the connection, links 265 are consider a physical link connecting nodes via interconnecting ports. When establishing global communication topologies, links 265 are treated as any other links connecting two ports within the fabric. Up/down links 265 connecting surface nodes 210 with GEO spacecraft 230 are thought to be relatively stable. If links 265 connect surface nodes 210 with spacecraft nodes 230 that are in flight, in low orbit, or in high earth orbit links 265 are expected to be established, broken, and re-established as necessary. However, such up/down links are expected to have predictable behavior that can be folded into determining communication topologies without requiring the paths to be periodically reconstructed as described below.

Surface-Based Network Fabric

Surface fabric 220 comprises a plurality of surface nodes 210 interconnected via surface links 225. Surface nodes 220 are considered to be devices supporting networking infrastructure located substantially on the Earth's surface (e.g., within 10 Km of sea level) as opposed to nodes at high altitude, LEO, MEO, GEO, or HEO. Suitable surface nodes 220 include switches, routers, access points, gateways, or other networking infrastructure as previously discussed.

Links 225 can also comprises wired or wireless links that preferably support multiple data channels. In a preferred embodiment, links 255 employ optic fibers capable of supporting a bandwidth of at least 10 Gbps, or more preferable at least 40 Gbps, over geographically significant distances (e.g., greater than 10 Km).

Surface fabric 220 provides for connectivity among two or more devices 212A through 212B. Devices 212A and 212B can include set-top boxes, computers, cell phones, PDAs, game systems, vehicles, or other devices that are capable of connecting to fabric 220.

Just a space fabric 240 includes a fabric manager; surface fabric 220 also includes a fabric manager, surface manager 215. In a preferred embodiment, each surface node 210 is fungible with respect to being surface manger 215. Manager 215 has responsibility for managing fabric 220 and can configure a communication topology among the nodes 210. Manger 215 can also operate as the global fabric manager.

Global Fabric Manager

In a preferred embodiment, global manager 217 manages the complete surface-space fabric 200, including surface nodes 210 and spacecraft nodes 230. Global manager 217 operates in a similar manner as local fabric managers 215 and 235 with the exception that it establishes a global communication topology among the surface and spacecraft nodes in cooperation with surface manager 215 and space manager 235. In fact, global manager 217 establishes a global communication topology that comprises paths from a first physical port on a spacecraft node 230 to a second physical port on a surface node 210, thus allowing a device 212A to communicate with a spacecraft 232A via the paths. Preferably, Surface-space fabric 200 operates as a single coherent switching device while function under the defined global communication topology established by global manager 217.

Although global manager 217 is depicted as being located on a surface node, one should recognize that all nodes 210 and nodes 230 of surface-space fabric 200 are fungible with respect to being the global fabric manager. Additionally, the global fabric manager can operate on a node common as the surface fabric manager or the space fabric manager. For example, global manager 217 could operate on the same node as surface manager 215 or space manager 235.

In some embodiments, global fabric manager 217 aggregates information, including port level information, about nodes 210 and 230 for uses in establishing the global communication topology. Preferably the information is obtained in cooperation with managers 215 and 235, both of which can obtain information about their local fabric. However, it is also contemplated that global fabric manager 217 can obtain the necessary information from each node individually. Once global manager 217 establishes a global communication topology in the form of one or more routing tables, it can disseminate the information to local fabric managers 215 and 235. Both local managers can then further disseminate the information (e.g., routing tables) to their local nodes.

By having global fabric manager 217 work in cooperation with local fabric mangers 215 and 235, surface-space fabric 200 can be globally optimized as well as locally optimized. Global manager 217 dictates the over-all communication topology including paths from a spacecraft node 230 port to a surface node port 210, and vice versa. Each local manager 215 or 235 can be configured accept or reject directives from global manager 217 to optimize local fabric links between nodes, or data channels. It is expected that local manager 215 or 235 could have more up-to-date information regarding their local nodes and could perform local optimization that would ordinarily be counter to directives from global manager 217.

Global manager 217 can cooperate with local managers in numerous ways. For example, the local managers can provide their local fabric data directly to global manager 217, the local managers can provide local path assignments with suggestions on up/down links for use, or local managers can conduct all local management functions and supply aggregated information to global manager 217.

It should be appreciated that nodes 210 and 230 are preferably fungible with respect to being the global fabric manager. Each of nodes 210 and 230 preferably store the complete communication topology information, possibly in the form of one or more routing tables. Should global manager 217 loose connectivity, fail, or otherwise become inoperable, any other of nodes 210 or 230 can become the new global manager quickly. In a preferred embodiment, a new global manager can be identified in less than 10 seconds, and more preferably less than 1 second. Given that each of nodes 210 or 230 has complete topology information, a node can become the node global manger nearly instantaneously. Naturally, such failover capabilities also apply to local managers 215 and 235.

In some embodiments, global fabric manager 217, surface manager 215, and space manager 235 could be organized into in a hierarchical management structure as suggested by U.S. Patent Publication 2005/0259571 to Battou titled "Self-Healing Hierarchical Network Management System, and Methods and Apparatus". However, due to the potentially dynamic nature or movement networking nodes 230 (e.g., a LEO satellite) relative to other nodes, space fabric 240 could become decoupled from surface fabric 220 periodically causing unnecessary overhead in reorganizing the overall management system. To reduce such overhead, each of fabric 220 and 240 can essentially operate as an autonomous fabric under the "suggestion" of global manager 217.

Due to the dynamic nature of up/down links 265, it is possible that space fabric 240 could loose connectivity with fabric 220. Consequently, one of space fabric 240 or surface fabric 220 could loose contact with global manager 217. Under such conditions, each local manager maintains coherency of their respective communication topologies. As used herein, "coherency" of the communication topology means that the local manager ensures that any viable paths established by the global fabric manager 217 are retained until connectivity with the global manager 217 can be restored, or until connectivity via up/down links 265 are re-established.

In a preferred embodiment, global manager 217 establishes the global communication topology and its paths among the ports of surface-space fabric 200 as a function of fabric metrics or properties. Metrics can include measurable values associated with fabric 200 as whole or each of local fabric 240 or 220. Contemplated metrics include congestion, throughput, loading, or other measurable values. Properties are considered attributes of the fabrics that do not substantially change with time. For example, a property can include predictable movement of nodes, or can include latency caused by the speed of light when communicating among GEO satellites. Global manager 217 utilizes the information for establishing paths from ports on nodes 210 and 230.

One should note that the properties of space fabric 240 could affect communications among device 212A, device 212B, spacecraft 232A, or spacecraft 232B. For example, if space fabric 240 comprises a constellation of GEO satellites intercommunicating using lasers, latencies due to the speed of light could affect protocol communications. Latencies could be as high as 500 milliseconds or even up to 900 milliseconds. Such latencies are thought to have little impact on node-to-node transport of packets in a switching fabric operating at or below layer 3 of the OSI model. However, for high-level protocols or stateful protocols, including TCP, such latencies can cause problems. Therefore, in some embodiments the algorithms used for communications among devices 212 or spacecraft 232 are adjusted to compensate for the properties of space fabric 240. For example, TCP can be adjusted by using TCP-LW (large window) to compensate for the large latencies.

In a preferred embodiment, global manager 217 provides an interface through which an administrator is able to manage global manager 217. The interface can include web-based applications, remotely accessible APIs, one or more management protocols, or other methods as known in the art. In a preferred embodiment, the interface allows the administrator to create or to control a policy comprising one or more rules that govern the establishment of the global communication topology. Although any set of rules can be defined, contemplated advantageous rules include (1) setting priorities for which links or data channels are used in path assignments, (2) setting bandwidth requirements for port-to-port communications, (3) setting latency requirements for port-to-port communications, (4) defining security requirements for paths, or (5) manually defined paths through fabric 200.

Global manager 217 can be administered by any suitable authorized entity, preferably an individual under authority of the United States government. Contemplated entities associated with the United States government include NASA, FEMA, Department of Defense or its military branches, Department of Homeland Security, or other government agencies or organizations. Such an administrator offers greater protection or optimization for the transport of mission critical data. Consider, for example, a scenario where FEMA must response to a disaster. FEMA would desire to retain connectivity to all national, or even global, resources to maintain logistic channels. An administrator associated with FEMA no matter their physical location could instruct global manager 217 to establish one or more redundant paths through fabric 200. The redundant paths could be manually configured to preferentially employ surface nodes 210, spacecraft nodes 230, or possibly intermediary nodes specifically placed during the disaster to facilitate communication. Furthermore, the administrator could configure a communication topology where FEMA data traffic is routed through low latency paths (e.g., through surface nodes or LEO satellites) while low-priority, general data traffic is routed through paths having higher latency (e.g., paths through GEO satellites). Global manager 217 can also be controlled or optimized during military operations, terrorism events, or other circumstances where connectivity is essential.

Intermediary Network Fabrics and Nodes

Figure 3:
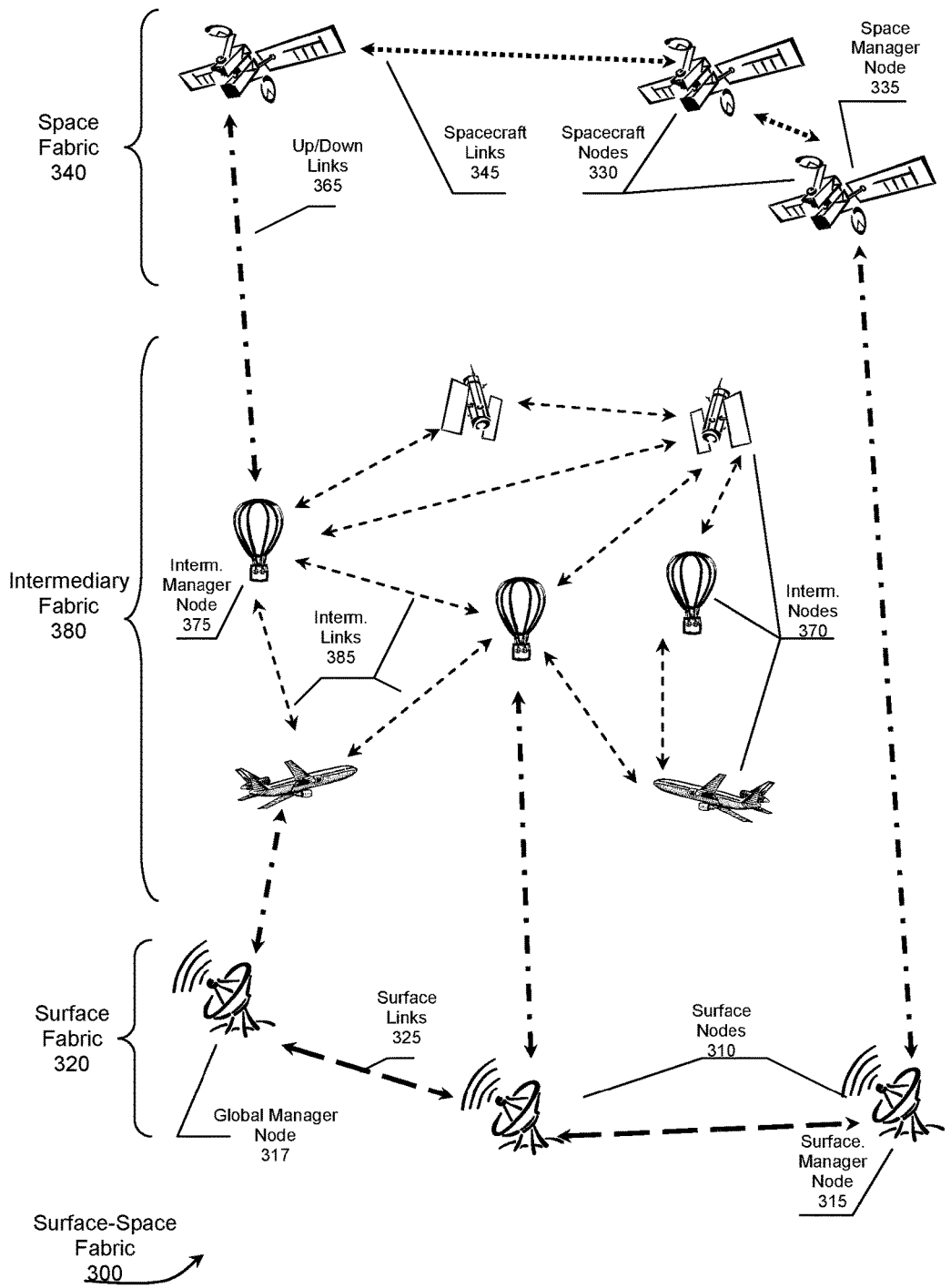
FIG. 3 is a schematic of a surface-space fabric comprising an intermediary fabric having intermediary nodes.

One should appreciate that more than two network fabrics can form a surface-space network fabric. In FIG. 3, surface-space fabric 300 comprises surface fabric 320, space fabric 340, and one or more of intermediary fabrics 380. Intermediary fabric 380 comprises a plurality of intermediary networking nodes 370 interconnected via intermediary communication links 385. Preferably fabric 380 also comprises intermediary manager 375 located on one of nodes 370.

As previously presented, space fabric 340 comprises a plurality of spacecraft nodes 330 interconnected via spacecraft links 345. Space manager 335 can manage or establish a communication topology among nodes 330. In a preferred embodiment, spacecraft nodes 330 are a constellation of GEO satellites interconnected via lasers where the satellites form a network fabric in space. One or more of spacecraft nodes 330 can communicate with intermediary nodes 370 or surface nodes 310 via up/down links 365.

Surface fabric 320 preferably comprises a plurality of surface nodes 310 interconnected via surface communication links 325 as previously described. Surface manager 315 can manage or establish a communication topology among nodes 310. Surface nodes 310 can also communicate with intermediary nodes 370 or spacecraft nodes 330 via up/down links 365.

Intermediary networking nodes 370 of intermediary fabric 380 preferably include objects located at an altitude between surface fabric 320 and space fabric 340. Intermediary nodes 370 are preferably equipped to communicate with surface nodes 310 or spacecraft nodes 330. Nodes 370 are contemplated to include powered flight craft (e.g., airplanes, blimps, etc. . . . ) or non-powered flight craft (e.g., balloons, gliders, satellites, etc. . . . ).

Intermediary fabric 380 can include manager 370. However, manager 370 is not necessary for the operation of intermediary fabric 380. Manager 370 can establish a communication topology among nodes 370 as previously described.

Global manager 317 operates to configure a communication topology among nodes 310, 330, and 370 in cooperation with local fabric managers, possibly including fabric manager 370.

One should note intermediary nodes 370, and by extension intermediary fabric 380, is thought to have more dynamic links relative to fabrics 320 or 340 due to the relevant movement of nodes 370 with respect to each other, surface nodes 310, or spacecraft nodes 330. Although nodes 370 are expected to move due to powered flight or non-powered flight, their movement can be predicted with sufficient accuracy that global manager 317 can establish port-to-port paths among all nodes. It is specifically contemplated that paths within a global communication topology can include time dependencies where a path can have a temporal extent. For example, global manager 317 can establish a path that includes routes through an LEO satellite that has intermittent connectivity with respect to specific surface nodes 310 or specific surface nodes 330. Global manager 317 constructs a routing table that includes path information defining at which times a path is active or inactive, and disseminates the routing tables to the nodes of fabric 300. The nodes of fabric 300 store the routing table and can utilize paths when they are active. It should be noted that an active path exists during an active period without requiring the path to be constructed. Should a packet encounter a situation where a path is no longer viable, a node can re-route the packet along a new path as determined by the routing table. Such an approach allows for establishing a global communication topology among nodes having dynamic links without requiring global manager 317 or local managers to constantly reconfigure the global or local communication topologies. Furthermore, the approach substantially reduces the need for sending routing table updates to all nodes when intermediary nodes 370 loose connectivity.

A surface-space network fabric as presented provides several advantageous capabilities. Connectivity among nodes of the integrated fabric can retain connectivity when an up/down link is lost due to jamming, natural causes, or equipment failure. Data packets can be switched to alternative paths around lost links or nodes. Additionally, paths within the fabric can be established in a deterministic fashion through a global fabric manger. Furthermore, intermediary nodes can be deployed and integrated into the surface-space fabric to enhance connectivity, possibly during emergency circumstances including a first response to a disaster or a military operation.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A distributed wireless network, comprising:
    a surface-based network fabric comprising a plurality of surface nodes interconnected with each other through physical links;
    an intermediary network fabric comprising a plurality of intermediary nodes configured to communicate with the plurality of surface nodes, wherein the plurality of intermediary nodes include at least one aircraft;
    and a network fabric manager configured to establish a network topology among the plurality of surface nodes and the plurality of intermediary nodes to communicatively connect a first wireless device to a second wireless device, and migrate from a first surface node to a second surface node while retaining connectivity between the first wireless device and the second wireless device.

2. The distributed wireless network of claim 1, wherein the network fabric manager comprises a centralized management system.

3. The distributed wireless network of claim 1, wherein the network fabric manager is communicatively coupled to the plurality of surface nodes by an optic fiber network.

4. The distributed wireless network of claim 1, wherein the surface-based network fabric is configured to provide a wireless service to at least one of a set-top box, a computer, a cell phone, a PDA, a game system, and a vehicle.

5. The distributed wireless network of claim 1, wherein the at least one aircraft includes at least one of powered flight craft and non-powered flight craft.

6. The distributed wireless network of claim 1, wherein the at least one aircraft includes at least one of airplanes, blimps, balloons, gliders, and satellites.

7. The distributed wireless network of claim 1, wherein the intermediary network fabric includes an intermediary fabric manager.

8. The distributed wireless network of claim 1, wherein the plurality of intermediary nodes are equipped to communicate with spacecraft nodes.

9. The distributed wireless network of claim 1, wherein the surface-based network fabric is configured to provide for at least one of internetworking, a storage area network, a distributed computing bus, a mesh network, and a peer-to-peer network.

10. The distributed wireless network of claim 1, wherein the network fabric manager is configured to retain connectivity between the first wireless device and the second wireless device upon a loss of an intervening physical link.

11. The distributed wireless network of claim 1, wherein the network fabric manager reconfigures the network topology upon a loss of an intervening physical link.

12. The distributed wireless network of claim 1, wherein the network fabric manager is configured to migrate in a deterministic fashion or a non-deterministic fashion.

13. The distributed wireless network of claim 12, wherein the deterministic fashion comprises migrating to a different networking node selected after a time period governed by a secret key.

14. The distributed wireless network of claim 12, wherein the non-deterministic fashion comprises at least one of a bidding process and an election process.

15. The distributed wireless network of claim 1, wherein the plurality of surface nodes comprise at least one of a switch, a router, an access point, and a gateway.

16. A method performed by a network fabric manager, comprising:
   establishing a network topology among a plurality of surface nodes in a surface-based network fabric and a plurality of intermediary nodes in an intermediary network fabric to communicatively connect a first wireless device to a second wireless device; and
   migrating from a first surface node to a second surface node while retaining connectivity between the first wireless device and the second wireless device.

17. The method of claim 16, wherein the plurality of intermediary nodes include at least one of powered flight craft and non-powered flight craft.

18. The method of claim 17, wherein the plurality of intermediary nodes include at least one of airplanes, blimps, balloons, gliders, and satellites.

19. The method of claim 16, further comprising reconfiguring the network topology upon a loss of an intervening physical link.

20. The method of claim 16, wherein the migrating comprises migrating in a deterministic fashion or a non-deterministic fashion.

* * * * *